June 20, 1950 — J. L. GRATZMULLER — 2,512,098

SEALING PACKING

Filed Oct. 21, 1946

Inventor
Jean Louis Gratzmuller
By: Glascock Downing Seebold
Attys.

Patented June 20, 1950

2,512,098

UNITED STATES PATENT OFFICE 2,512,098

SEALING PACKING

Jean Louis Gratzmuller, Paris, France

Application October 21, 1946, Serial No. 704,682
In France October 24, 1945

3 Claims. (Cl. 309—4)

This invention relates to sealing packings for sliding members and more particularly for pistons adapted to move within cylinders and subjected at least on one of their sides to high fluid pressures.

An object of the invention is to provide a sealing packing which may be adapted to any piston in an extremely simple manner without requiring the provision of conventional grooves either in the piston or in the cylinder body.

Another object of the invention is to provide a sealing packing adapted to be placed against the face of the sliding member such as a piston for example and which may be secured or not on said piston.

According to one feature of the invention the sealing packing is constructed so as to ensure a perfect sealing on one hand between the cylinder wall and the packing and on the other hand between this latter and the face of the sliding member against which this packing is applied.

In accordance with another feature of the invention, the sealing packing is constituted by an assembly comprising a metal ring forming a support and a part made of a plastic material such as natural or synthetic rubber moulded on said ring and presenting thereon two sealing surfaces, one cylindrical extending in the axial direction over the outer edge of one of the faces of said ring and the other in the form of a flat ring provided on the opposite face of said ring.

According to still a further feature of the invention the supporting ring is provided on its both sides with an annular groove, which grooves are adapted to receive the moulded plastic material forming two packing rings presenting respectively a cylindrical and a flat ring sealing surfaces.

According to another feature of the invention a groove is provided on the side of the supporting ring facing the sliding member or piston which groove communicates with the opposite side of said ring by means of a plurality of passages of a desired form and cross section so that when the plastic mass is moulded on the side of said ring facing the sliding member it fills completely the corresponding groove and said passages and overflows on the opposite side of the ring, said mass forming a cylindrical portion of a diameter at least equal to that of the ring and being intended to come into frictional contact with the cylinder wall.

According to still a further object of the invention the packing ring of the flat annular form on the upper side of the supporting ring ensures the sealing between the packing assembly and the piston whilst the packing ring of the cylindrical form on the lower side of the supporting ring ensures the sealing between the packing assembly and the cylinder.

The plastic material is thus freely applied against its support and is not subjected to any presssure other than the fluid pressure, this latter being effective to press the packing assembly against the face of the piston with a force proportional to the prevailing fluid pressure. The plastic material may adhere or not to the supporting ring, its adherence being eventually ensured in any suitable manner.

In one preferred embodiment of the invention the supporting ring is provided on its side opposite to that applied against the piston with a groove having its outer wall tapered toward its outward edge so that the plastic packing while bearing against said edge forms thereon a resilient lip.

The sealing packing according to the invention may be secured to the piston, if desired, this being accomplished in any suitable manner.

According to a particular embodiment of the invention the packing assembly of the type specified may be used for guiding a piston in a cylinder. For this purpose there is provided on the face of the piston a cylindrical extension of a diameter equal to the inner diameter of the metal ring of the packing assembly and this ring is mounted on said extension and fixed thereon in any suitable manner. In this manner the guiding of the piston in the cylinder may be accomplished without requiring a precise machining or treatment of the outer wall of the piston providing thereby an important reduction in the cost of production.

The exact shape of the ring, grooves and passages which may connect the two grooves, the material of the ring and of the plastic packing as well as the means for securing the packing assembly on the piston may vary to suit the conditions of use without departing from the spirit of this invention, the various objects, advantages and characteristics of which will appear from the consideration of the following description and the annexed drawings showing by way of example one form of embodiment of the invention.

Figure 1:
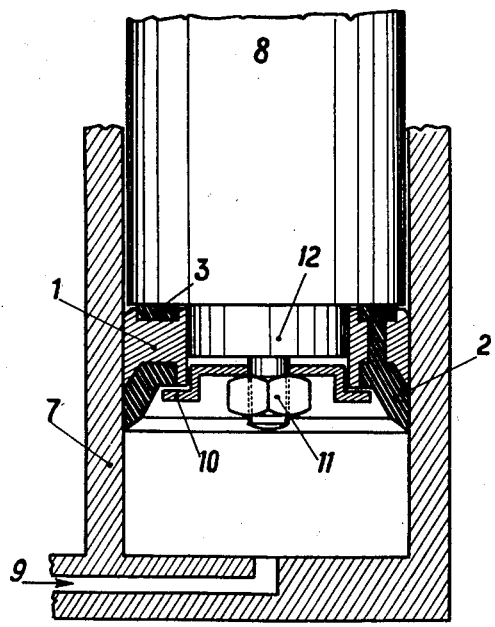
Fig. 1 is a section view of the extremity of a cylinder showing the end portion of the piston provided with a packing assembly according to the invention.
Figure 2:
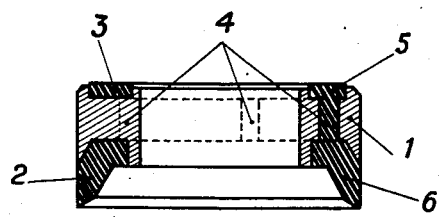
Fig. 2 is a section view of the packing assembly.
Figure 3:
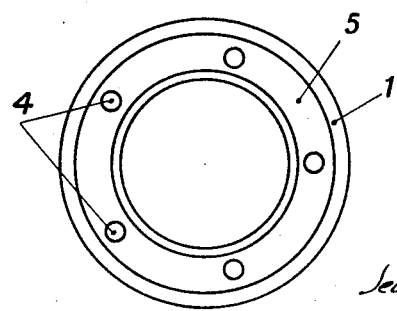
Fig. 3 is a plane view from above of the metal ring with plastic packing removed.

Referring now to the drawings there is shown a cylinder 7 fed with fluid pressure at 9 and having sliding therein a piston 8. The sealing packing according to the invention comprises a metal ring 1 provided respectively on its opposite sides with two grooves 5 and 6 which may be, but not necessarily, connected by passages such as 4. On this ring is moulded a plastic packing forming two sealing rings 2 and 3 on the opposite sides of said metal ring 1 one of said rings being of a flat annular form and the other presenting a circular resilient lip projecting beyond the edge of the corresponding groove 6. The first of said rings is adapted to provide a flat sealing surface in cooperation with the face of the piston and the second constitutes a cylindrical sealing surface in cooperation with the cylinder wall.

In the example shown in the drawings piston 8 is provided with an extension 12 having a cylindrical form of reduced diameter with respect to said piston and carrying mounted thereon ring 1, this latter being secured on said extension 12 by means of a suitably shaped washer 10 and engaged by a nut 11 screwed on a bolt projecting from the end of said extension. It is to be understood of course that in case it is not desired to ensure the guiding of the piston by means of ring 1, this extension 12 may be dispensed with.

There is thus provided a novel sealing packing structure for sliding parts such as pistons and cylinders with the use of a supporting member and two packing elements of plastic material moulded on said supporting member and forming respectively a sealing surface contact with the face of a sliding part such as a piston and a sealing surface contact with the cylinder wall. The packing furthermore is such that it ensures the guiding of a piston in a cylinder.

Although only one embodiment of the invention has been illustrated and described in detail various changes and modifications in the construction and relative arrangement of parts which will now appear to those skilled in the art may be made without departing from the scope of the invention. Reference is therefore to be made to the appended claims for a definition of the limits of the invention.

What I claim is:

1. A sealing packing comprising a ring shaped supporting member, an annular groove on one side of said ring member, an annular groove on the opposite side of said ring member, said last groove being provided with an outwardly tapered edge, a packing element of plastic material moulded in the first of said grooves and forming a flat annular ring and a packing element of plastic material moulded in the second of said grooves to form an annular lip shaped cylindrical member extending beyond the tapered edge of said groove.

2. A sealing packing comprising a ring shaped supporting member, an annular groove on one side of said ring shaped member, an annular groove on the opposite side of said ring member, said last groove being provided with an outwardly tapered edge, passages in said ring member interconnecting said two grooves and a single mass of plastic material moulded on said ring so as to fill said grooves and passages and form a packing element of a flat annular ring shape in the first of said grooves and a packing element forming an annular lip shaped cylindrical member extending beyond the tapered outer edge in the second of said grooves.

3. In a piston slidable in a cylinder, the combination of a cylindrical extension on the end face of the piston, a sealing packing comprising a ring shaped supporting member, an annular groove on one side of said ring member, an annular groove on the opposite side of said ring member, said last groove being provided with an outwardly tapered edge, a packing element of plastic material moulded in the first of said grooves and forming a flat annular ring, and a packing element of plastic material moulded in the second of said grooves to form an annular lip shaped cylindrical member extending beyond the tapered edge of said groove, and means for securing said ring shaped supporting member on said cylindrical extension of the piston.

JEAN LOUIS GRATZMULLER.

REFERENCES CITED

The following references are of record in the file of this patent:

UNITED STATES PATENTS

| Number | Name | Date |
| --- | --- | --- |
| 1,577,732 | Lamb | Mar. 23, 1926 |
| 1,773,629 | Millmine | Aug. 19, 1930 |
| 2,287,456 | Springston | June 23, 1942 |
| 2,322,010 | Fowler | June 15, 1943 |